United States Patent
Goodman

(10) Patent No.: US 6,557,857 B1
(45) Date of Patent: May 6, 2003

(54) RADIAL LIP SEAL

(75) Inventor: James R. Goodman, Corona, CA (US)

(73) Assignee: Saint-Gobain Performance Plastics Company, Wayne, NJ (US)

( * ) Notice: Subject to any disclaimer, the term of this patent is extended or adjusted under 35 U.S.C. 154(b) by 0 days.

(21) Appl. No.: 09/287,610

(22) Filed: Apr. 7, 1999

Related U.S. Application Data

(60) Provisional application No. 60/081,406, filed on Apr. 10, 1998.

(51) Int. Cl.$^7$ ................................. F16J 15/32
(52) U.S. Cl. ................ 277/549; 277/553; 277/569; 277/572
(58) Field of Search ................ 277/549, 569, 277/572, 573, 574, 553, 349, 351, 402

(56) References Cited

U.S. PATENT DOCUMENTS

| | | | |
|---|---|---|---|
| 758,675 A | | 5/1904 | Meuser et al. |
| 2,480,116 A | * | 8/1949 | Brummer |
| 2,647,002 A | | 7/1953 | Brummer |
| 2,729,482 A | | 1/1956 | Kosatka |
| 2,826,441 A | | 3/1958 | Niessen |
| 3,001,385 A | | 9/1961 | Allen |
| 3,123,367 A | * | 3/1964 | Brummer et al. |
| 3,180,650 A | * | 4/1965 | Liebig |
| 3,661,400 A | | 5/1972 | Weinand |
| 3,866,924 A | | 2/1975 | French |
| 5,052,696 A | * | 10/1991 | Hatch |
| 5,163,692 A | | 11/1992 | Schofield et al. |
| 5,303,934 A | * | 4/1994 | Elliott .................. 277/24 |

* cited by examiner

Primary Examiner—Lynne H. Browne
Assistant Examiner—James M. Hewitt
(74) Attorney, Agent, or Firm—Christie, Parker & Hale, LLP

(57) ABSTRACT

A radial lip seal for sealably mounting within a split circular seal housing includes a seal body having a channel disposed along a seal body outside diameter. The radial split seal includes an annular seal body which is divided into at least two substantially similar semi-annular seal body sections that are each connected together at end portions. The seal body formed from such sections includes a sealing lip that extends radially inwardly from the body for slidable sealing contact around a rotatable shaft. An energizer is seated within the channel. The seal is mounted within a seal housing that is configured to fix the axial placement of the seal therein. The energizer is interposed between the seal and the seal housing to both allow the seal to move radially a desired distance within the seal housing in response to seal thermal expansion and contraction, and to provide a leak-tight seal therebetween.

12 Claims, 4 Drawing Sheets

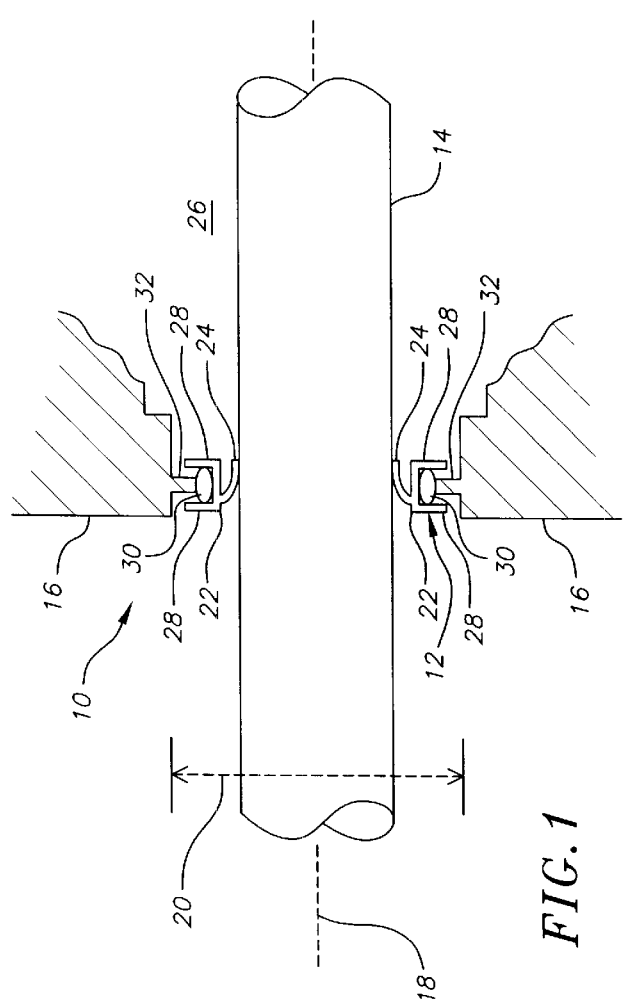
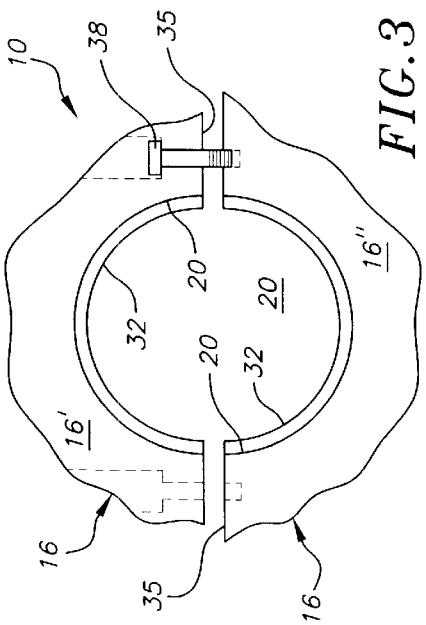
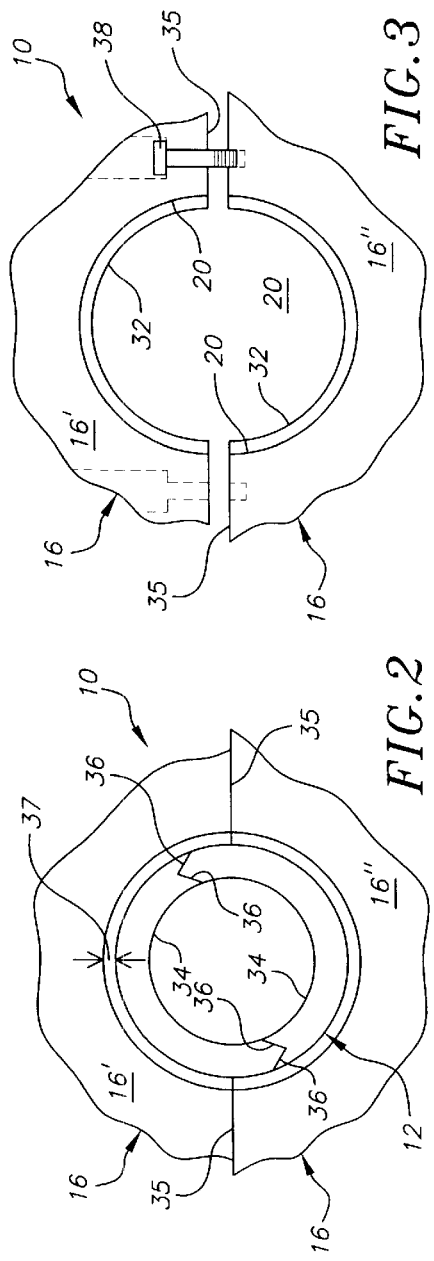

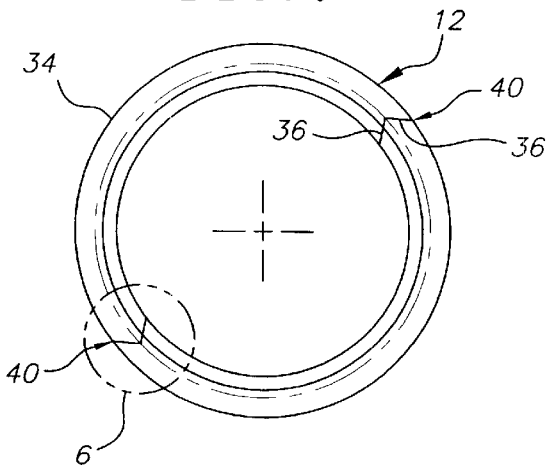
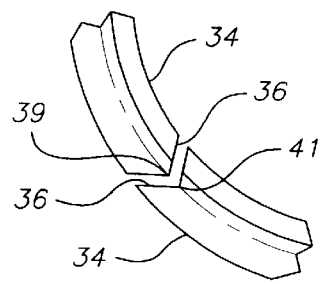
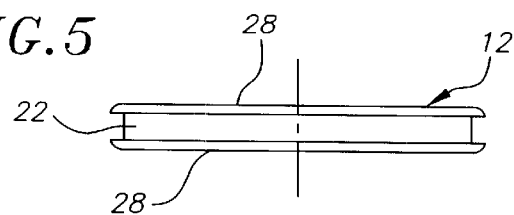
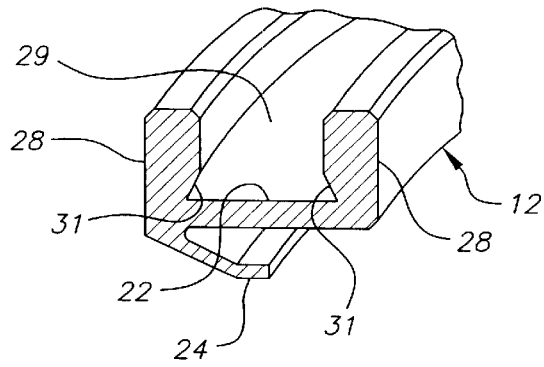
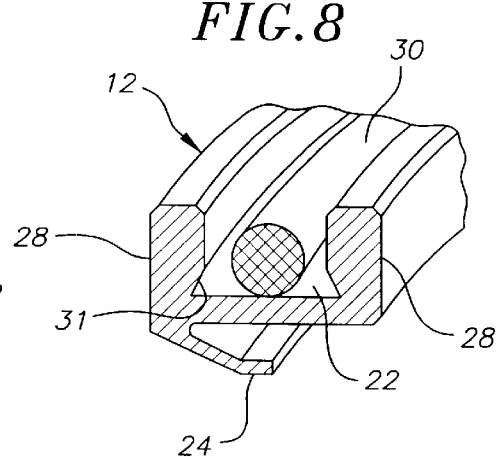
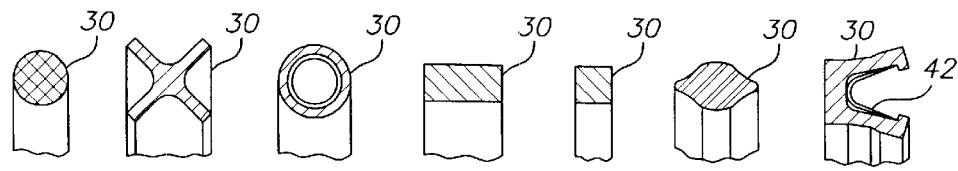

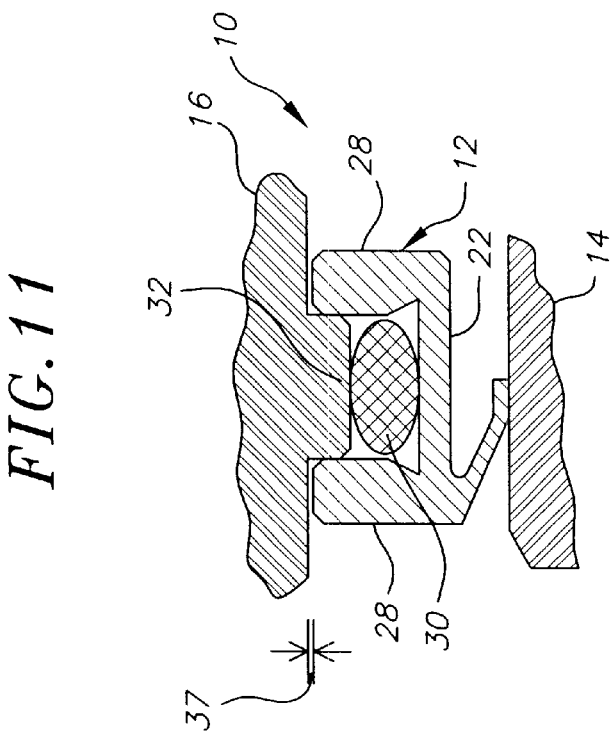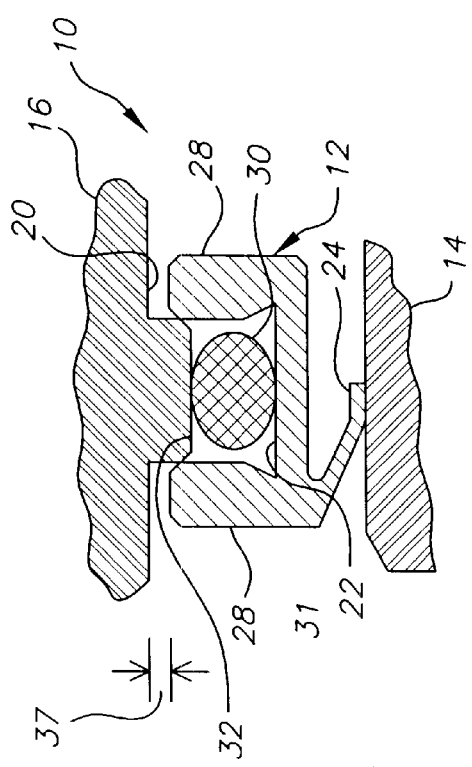

RADIAL LIP SEAL

CROSS-REFERENCE TO RELATED PATENT APPLICATION

This patent application claims priority of U.S. Provisional Patent Application No. 60/081,406 that was filed on Apr. 10, 1998.

FIELD OF THE INVENTION

This invention relates generally to seals for rotary shafts and more particularly, to an improved radial lip seal and seal housing for sealing around a rotatable shaft.

BACKGROUND OF THE INVENTION

Radial lip seal assemblies are used to prevent fluids (liquids or gasses) from leaking along a rotatable shaft from a relatively higher pressure region in an apparatus in which the shaft is mounted to a relatively lower pressure region. Such radial lip seal assemblies typically include a circular or annular seal ring or body which is sealably fit within a seal bore formed within the seal housing surrounding the rotatable shaft. A sealing lip extends radially inward from the seal body to slidably contact against the rotatable shaft and provide a leak-tight seal therewith Where practical, a continuous or single piece radial lip seal is used. The seal is slid over the shaft and secured to the seal housing. However, in some applications, the continuous radial lip seal cannot be used or is simply not practical. For example, when sealing against a shaft with an oversized end, the seal may not stretch sufficiently to pass over the enlarged end. Similarly, disassembly and reassembly of complex and enlarged components such as flanges and gears, to get access to the shaft, may not be practical. To accommodate these applications, multi-piece or split seals are used. Radial lip split seals may also be used in applications where single piece or continuous radial lip seals would be difficult or time consuming to replace. The radial split seal may be separated into its two or more semi-annular pieces and then reassembled around an appropriate location of the shaft.

Known lip seal technology and particularly, radial split seal technology, centered around the use of elastomer rubbers. However, these elastomer seals have a very limited temperature and velocity range in which they can operate as radial lip seals. Elastomer rubber radial lip seals also have a limited shelf life and have uses that are limited to a narrow range of compatible fluids and gasses.

With regard to split seals, split packings and split mechanical seals are also used for sealing between a seal housing and a rotatable shaft. However, split packings and split mechanical seals typically require complex hardware designs to ensure adequate sealing and seal life. In addition, these split packings and mechanical seals require additional space, assembly and maintenance. The complex hardware design and assembly often results in additional costs.

In an effort to overcome these problems of the known elastomer rubber split seals as well as the inconveniences and expenses of the split packings and split mechanical seals, an effort has been made to produce radial lip split seals made from fluoroplastic or fluoropolymeric materials. The fluoroplastic materials provide a greater temperature operating range for the seal as well as increasing the number of compatible fluids and gasses. However, the development of fluoroplastic radial split seals has been limited due to a number of disadvantages. Some of the disadvantages include flow creep of the seal material, deformation of the seal due to compression set and resizing of the seal due to thermal and compression effects. These disadvantages all tend to cause leakage across the seal.

Flow creep, compression set, and resizing are characteristics exerted by almost all plastic seals which are exposed to heat while the seal is restricted from expanding in its natural radially outward direction. The application of heat leads to thermal expansion of the seal and particularly to an increase in the seal's outer diameter. This radial outward expansion is typically restricted by the seal housing, which leads to a buildup of compressive stress within the seal. These stresses tend to distort and/or resize the seal. Seal size and shape, temperature range, time at which the seal is held at the various temperatures, the thermal expansion characteristics of the particular plastic material used as well as its mechanical properties, as well as the amount of expansion that is actually restricted, are just a few of the key parameters that define the amount of permanent deformation or resizing a seal will experience.

Resizing and deformation, as described above, can lead to shrinkage of the physical size of the seal. This includes a shrinkage of the inside diameter. With radial split seals, this shrinkage leads to a separation of the individual semi-annular sections of the seal as the seal is maintained tight against the shaft. This separation breaks the continuous radial seal barrier around the shaft and leads to leakage at the interfaces between the split ends of the semi-annular seal sections.

As an example of a resizing problem and particularly, a problem when using a conventional fluoroplastic radial split seal, consider a two piece semi-annular radial seal split placed into a seal housing bore. Typically, the seal housing bore has a slightly smaller diameter than the outside diameter of the seal. This configuration creates a slip fit or slight press fit, sufficient to maintain the radial seal within the housing bore and fluidly seal therebetween. A shaft is then inserted through the inside diameter of the radial split seal to create a complete fluid barrier.

In this configuration, positive sealing is expected across the seal lip with only slight leakage at the split joints. If the seal is required to perform at typical ambient temperatures and relatively low rotational velocities, the desired positive sealing may be achieved. However, most applications see various temperature swings, which can be extreme, throughout their life cycle. In addition to the application temperatures, additional heat is generated when the shaft rotates and creates a friction between the rotating shaft and the stationery sealing lip. As the shaft rotational speed increases, this heat generation can become substantial.

As previously mentioned, heat tends to thermally expand the seal. This thermal expansion results, in part, to an increase in the overall outer diameter of the seal. However, the fixed diameter bore formed within the seal housing physically restricts this radially outward expansion and causes compressive stresses to build within the fluoroplastic seal body. These internal stresses cause the seal to physically alter its shape and can even lead to a resizing of the seal to a new diameter.

After the seal is allowed to cool and thermally contract, the seal outer diameter will measure slightly smaller than when initially installed. This diametrical shrinkage and resizing can create leakage problems. For example, the resized seal may leak between the outer diameter of the seal and the seal bore. Leakage may also occur at each of the split joints. This is a particular concern where the shaft is applying load to the sealing lip in an outward direction. The outward load causes the seal to push radially outward and thus, open at the split joint locations. Since the seal has shrunk, the housing bore is no longer in contact with the seal outside boundary and the split joint is allowed to open.

SUMMARY OF THE INVENTION

The present invention overcomes the aforementioned problems by providing a radial lip seal and seal housing which allows the seal to thermally expand and compensate for different heats without substantial physical restriction. When subject to application temperatures and heat, the radial lip seal of the present invention is not restricted from thermally expanding by the seal bore of the seal housing. This nonrestrictive configuration eliminates the shrinkage and resizing problems of the known fluoroplastic radial lip seals. By providing a specifically configured seal outer diameter which freely floats within a compatibly configured seal housing, the seal is free to thermally expand and contract without substantial restriction.

The present invention is generally directed to a radial lip seal for sealably mounting in a seal housing having a circular seal bore and for sealably surrounding a shaft. More specifically, the present invention is directed to a radial lip split seal and seal housing for sealably surrounding a circular shaft. The radial split seal comprises an annular seal body which is sealably supported within a seal bore formed in the seal housing. The seal body is divided into two or more of semi-annular seal body sections which sealably fit together to form a continuous annular seal. Each of the seal body sections includes a channel disposed along an outside diameter having a sidewall surfaces formed by a pair of spaced apart legs that extend radially outwardly from a channel base. A sealing lip extends radially inward from the seal body and is adapted for sealable and slidable contact against the shaft.

Each of the seal body sections extends between split ends along a portion of the circular seal bore within the seal housing. Opposing split ends on adjacent seal body sections are configured for sealable contact against each other. An annular energizer is provided within the channel between the spaced apart legs. The energizer provides a radially compressive fit which sealably maintains the seal body sections together and the seal lip sealably against the shaft.

The radial split seal is sealably mounted in a split circular seal housing mutual engagement of cooperative seal and seal housing members to fix the seal axially within the seal body. In one embodiment, the seal housing includes a projection that extends radially inwardly a distance and that is disposed within the seal channel to restrict axial movement of the seal therein by engagement of the projection and seal sidewalls. In such embodiment, the energizer is interposed between the projection and the channel base to provide a desired degree of radial seal movement within the housing. In another embodiment, the seal body includes a groove disposed along a diameter surface and at least a portion of the seal body channel and seal body are disposed therein to restrict axial movement of the seal therein by engagement between the adjacent groove and channel sidewall surfaces. In such other embodiment, the energized is interposed between the channel base and groove to provide a desired degree of radial seal movement within the housing.

This invention, together with the additional features and advantages thereof, which is only summarized in the foregoing passages, will become more apparent to those of skill in the art upon reading the description of the preferred embodiments, which follows in the specification taken together with the drawings.

DESCRIPTION OF THE DRAWINGS

These and other features and advantages of the present invention will become appreciated as the same becomes better understood with reference to the specification, claims and drawings herein:

FIG. 1 is a schematic cross-sectional side view of a first embodiment radial lip seal and complementary seal housing, constructed according to the principles of the present invention, as shown surrounding a shaft;

FIG. 2 is a front view of the first embodiment radial split seal and complementary seal housing of FIG. 1;

FIG. 3 is a front view of the seal housing of FIG. 2 shown split apart;

FIG. 4 is a front view of the first embodiment radial split seal of FIG. 2;

FIG. 5 is a top plan view of the radial split seal of FIG. 4;

FIG. 6 is an enlarged partial front view of the radial split seal of FIG. 4 taken from section 6—6;

FIG. 7 is a partial perspective view of the radial lip seal of FIG. 4;

FIG. 8 is a partial perspective view of the radial lip seal of FIG. 7 shown including an energizer;

FIG. 9 is a partial perspective view of various embodiments of energizers constructed in accordance with the principles of the present invention;

FIG. 10 is a cross sectional view of the radial split seal of FIG. 4 shown supported in a seal housing and sealing against a sealing surface;

FIG. 11 is a cross sectional view of the radial split seal as illustrated in FIG. 10, shown in a thermally expanded state;

DETAILED DESCRIPTION OF THE INVENTION

Figure 12:
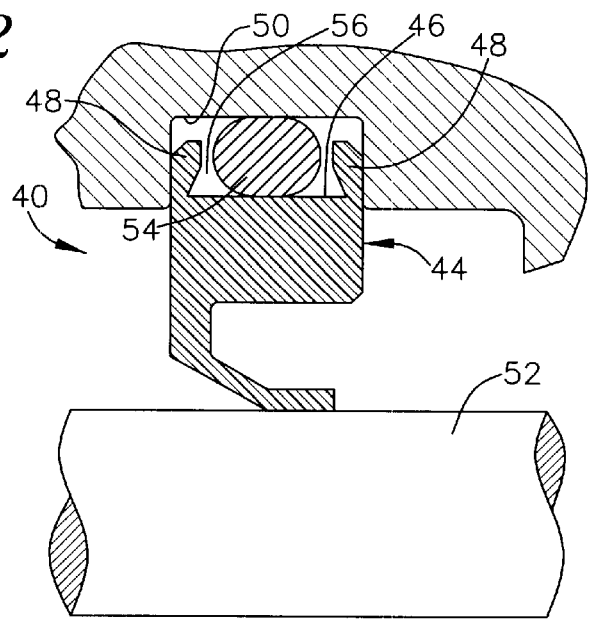
FIG. 12 is a schematic cross-sectional side view of a second embodiment radial lip seal and complementary seal housing, constructed according to the principles of the present invention, as shown surrounding a shaft.

Radial lip seals of this invention are designed to be radially free-floating radial within complementary seal housing to reduce the potentially harmful and undesired thermal expansion effects that are known to occur with radial seals. Specifically, radial seals of this invention are designed having an outside surface that is configured to fit with a complementary seal housing surface to both fix the axial position of the seal therewith, and to permit the seal to move radially within the seal housing due to operating temperature fluctuations when placed in sealing contact around a rotating shaft.

FIG. 1 illustrates a first embodiment annular radial lip seal 10 constructed according to the principles of the present invention. The radial lip seal 10 has a seal body 12 that surrounds a shaft 14 and that is supported within a stationary seal housing 16. The shaft 14 is rotatable about its longitudinal axis 18 and passes through a seal bore 20 within the seal housing 16.

Referring to FIGS. 1 and 7, the radial seal body 12 is in the shape of a generally circular ring. The seal body includes a base 22 having a lip 24 extending radially inwardly away from the base to form an inner seal surface for sealable and slidable contact against a surface of the circular shaft 14. The lip 24 can be formed of a material having a substantially uniform sectional thickness as is common in seal technology. However, the lip 24 may be formed in any fashion desired which forms a circular surface capable of sealing against a rotating shaft 14 as is known to those of skill in the art. The lip 24 may be oriented, relative to the shaft, such that the distal end of the lip faces into a region of higher pressure 26 along the shaft so that fluid in the higher pressure region can assist in sealably maintaining the lip 24 against the shaft 14. This is thus, the preferred orientation, especially in higher pressure applications. However, this orientation is not required and the lip 24 may be oriented facing either direction along the axis 18 of the shaft 14. The lip 24 may also be provided as a symmetrical lip without orientation.

The seal body 12 includes a pair of spaced apart legs 28 that each extend radially outwardly from the base 22 to form an open pocket or chamber 29 within the body having generally U-shaped cross section. However, the pocket 29 formed between the legs 28 may have differing shapes and may include a groove or grooves 31 on the inner surface of each leg. An energizer 30 is disposed within the pocket 29 and is interposed between the seal body 12 and the housing 16, and forms a seal therebetween. Preferably, the energizer 30 is an annular member which fits in the pocket between the spaced apart legs 28 of the seal body 12. The energizer 30 provides a static seal between the base 22 and a circumferential rib 32 which extends radially inward from the seal bore 20 within the housing 16. The energizer 30 also prevents the seal body 12 from rotating relatively to the circumferential rib 32. Axial placement of the seal 10 within the seal housing is maintained by the placement of the circumferential rib 32 within the pocket formed between the radially outwardly extending legs 28. The legs 28 are sufficiently spaced apart to both allow the seal body 12 to freely float and thermally expand in a radial direction within the seal bore 20, and yet provide a leak-tight seal therebetween.

The seal body 12 is made from a plastic material, and is preferably formed from a fluoropolymer plastic material. Fluoropolymer materials are selected for their excellent wear properties, even under low lubricity conditions. A filler may be added to the fluoropolymer to improve wear resistance and other seal properties. Fillers may include, for example, ground carbon particles, ground graphite particles, small particles of fiberglass, as well molybdenum disulfide. Preferably, the filler material accounts for between approximately 2 percent and approximately 15 percent of the seal body 12. Alternatively, the seal body may be made from other plastic materials, such as a ultra high molecular weight polyethylene (UHMW).

Preferably, the seal body 12 is machined from a hollow tube or billet of polytetrafluoroethylene (PTFE) having approximately 2 to 15 percent filler. The machined seal body 12 may then be cut into the desired seal body sections 34. The seal body 12 may also be molded and then finish machined as necessary.

Mechanical seal assemblies provided in accordance with the practice of the present invention can be used in any apparatus which incorporates a shaft and in which it is desired to inhibit flow of fluids along the shaft from a higher pressure region to a lower pressure region. Such apparatus can include, for example, pumps, starter motors, crankshaft seals in combustion engines and other similar equipment. The radial seal 10 of the present invention is particularly useful where split seal applications are desired and where wide temperature variations may occur or where the application of a fluoroplastic seal will provide enhanced performance.

Referring now to FIGS. 2 and 3, the radial lip seal 10 of the present invention will be described in greater detail. In the illustrated embodiment, the radial lip seal 10 is split into two semi-annular seal body sections 34 which fit together to form the radial split seal body 12. Each seal body section 34 extends between opposing split ends 36. Each split end 36 is configured to sealably seat against an adjacent split end. Alternatively, the seal body 12 may be divided into a plurality of seal body sections 34.

The energizer (30 in FIG. 1) is placed between the spaced apart legs 28 (FIG. 1). In addition to providing a sealing surface between the housing 16 and the seal body 12, the energizer maintains the seal body sections 36 together in a circular shape around the shaft 14.

The illustrated radial lip seal 10, which has a plurality of semi-annular seal body sections 34 that are splitable is advantageous in applications where a continuous or single piece radial lip seal cannot be used or is simply not practical. This includes applications where, for example, the shaft includes an oversized end which the seal can't sufficiently stretch over without damage. The radial split seal 10 is similarly advantageous where the access to the shaft to replace or service the seal is not practical or possible.

The housing 16 may also comprise a plurality of housing portions. Preferably, the housing 16 comprising two housing portions 16' and 16" having compatible mating surfaces 35. The split housing 16 advantageously simplifies installation and removal of the radial split seal 10. Fasteners 38 may be provided to maintain the opposing seal housing portions 16' and 16" together.

Each housing portion 16' and 16" is formed with a respective portion of the seal bore 20 and the circumferential rib 32. Preferably, each housing portion 16' and 16" forms one half of the seal bore 20 and one half of the circumferential rib 32. When the housing portions 16' and 16" are secured together, the seal bore 20 forms a continuous circular opening having a uniform seal bore diameter. The seal bore 20 is adapted to receive the radial seal 10 of the present invention, however, the diameter of the seal bore 20 is greater than the outer diameter of either of the seal legs 28. This forms an annular spacing 37 between the seal bore 20 and the outer diameter of the legs 28. The radial lip seal 10 of the present invention is designed so that the seal body 12, including the legs 28, never make a diametrical contact with the seal housing 16.

Similarly, the circumferential rib 32 on each housing portion 16' and 16" form a continuous uniform circumferential rib or ridge which extends radially inward from the seal bore 20 to form a smaller diameter than that formed by the seal bore 20 itself. Preferably, the circumferential rib 32 is centered across the width of the seal bore 20, as is best illustrated in FIG. 1. The circumferential rib 32 is adapted to be received between the spaced apart legs 28 of the seal body 12.

The seal housing 16 may be any structure or portion of such structure, which separates the higher pressure region 26 (FIG. 1) from a lower pressure region. Preferably, housing 16 is made from a structural member having sufficient width to support the seal groove 20 and circumferential rib 32 and which is adapted to be removably secured to the structure otherwise supporting the shaft 14 (FIG. 1). The housing 16 may be constructed from a metal such as an aluminum, but may also be made from any material having suitable mechanical and chemical properties for the expected applications. These materials include, for example, carbon steel, high strength structural plastics and composites. Preferably, the housing 16, and particularly, the circumferential rib 32, is machined, however, other methods of construction may also be used, for example, casting, forging and molding may each be suitable depending on the respective material used.

Referring now to FIGS. 4–6, a first embodiment annular seal body 12 is illustrated in detail. The seal body 12 includes two semi-annular seal body sections 34. Each section 34 extends between opposing split ends 36 at either distal end. The seal body sections 34 mate together at respective split ends 36 to form a sealed joint 40. These split joints 40 may be of any type as is known to those of skill in the art, however, an interlocking "V" type joint is preferred.

The interlocking "V" joint 40 is accomplished by forming a split end 36 having an outward taper 39 on one end of each seal body section 34, and a split end having an inward taper 41 on the other end of the seal body section. In this way, each split end 36 forming an outward taper 39 sealably fits into the split end forming an inward tapered 41, as is known in the art of split seals. To enhance this static sealing, the angle formed by the outward tapering split end 36 may be made slightly less than the angle formed by the respective inward tapering split end, as is also known in the art. The use of an interlocking "V" joint advantageously prevents misalignment due to the applied loading from the energizer 30.

Referring in particular to FIG. 5, the legs 28 of the seal body 12 are spaced apart to define the base 22. Preferably, the base 22 is generally flat surface and is adapted to form a sealed contact with an energizer (30 in FIG. 1). However, the base 22 may define any surface capable of sealing with the particular energizer. The legs 28 are adapted to maintain the energizer therebetween. Preferably, at least one of the spaced apart legs 28 extends radially outward beyond the outer diameter defined by the energizer 30. More preferably, each of the legs 28 extends to a substantially similar outer diameter which is greater than the overall outer diameter defined by the energizer 30.

Referring now to FIGS. 7 and 8, in conjunction with FIG. 1, the interaction of the radial lip seal body 12 and the energizer will be described in greater detail. In particular, the energizer 30 is adapted to form a fluid tight seal between the seal bore 20 within the seal housing 12 and the seal body 12. This fluid tight seal is maintained during all phases of the radial lip seal 10 operation, including when the seal is thermally expanded as well as contracted.

The energizer 30 is fitted around the seal body 12 and preferably seats against the annular surface of the base 22. Preferably, the energizer 30 has an overall diameter which is slightly smaller than the outer diameter of the base 22. This configuration maintains a tension in the energizer 30 and a corresponding compressive force about the seal body 12. This is particularly advantageous when the radial lip seal comprises a plurality of semi-annual seal body sections (34 in FIG. 2).

The energizer is formed from an elastic material capable of being relatively easily compressed. This allows the energizer 30 to accommodate the thermal expansion of the base 22 without imparting substantial compressive stress or physical restraint into the seal body 12. Thus, the energizer 30 is preferably constructed from a material having elastomeric properties. More preferably, the energizer 30 is made from an elastomer, such as, for example, a fluorocarbon elastomer, a nitrile (NBR), a butadiene or most any other elastomer rubber which is compatible with the surrounding medium.

Referring now to FIG. 9 the energizer 30 may take on most any form or shape. In particular, the energizer 30 is preferably circular or rectangular and may even be a conventional O-ring as known to those of skill in the art. However, the energizer may have any variety of cross sections, for example, as illustrated, depending on the particular application. In most applications, the energizer 30 will be adapted to allow for the maximum expansion and contraction of the seal body 12 and the housing 14. (FIG. 1). Alternatively, the energizer 30 may be adapted to maintain sufficient tensile force around the seal body sections 34 to maintain the seal at the joints 40 (FIG. 4) therebetween. The energizer 30 may even include a spring element 42, such as an annular stainless steel "V" spring, to facilitate formation of the seal between the circumferential rib 32 (FIG. 3) and the base 22 (FIG. 7) of the radial seal 10 of the present invention.

Referring now to FIG. 10, in conjunction with FIG. 1, the radial lip split seal of the present invention will be described in greater detail. As illustrated, the radial lip seal 10 is in a non-thermally expanded or ambient state. This may be, for example, a static state where the shaft 14 is stationary or where operating conditions are relatively cool and without substantial thermal effects. In these operating conditions, the annular spacing 37 between the diameter of the seal bore 20 (as best illustrated in FIG. 1) and the overall outer diameter defined by the legs 28 of the seal 10 is at a practical maximum (it may be possible for this spacing 37 to increase if the seal 10 is cooled or otherwise thermally contracted).

The sealing lip 24 slidably contacts against the outer surface of the shaft 14 and forms a sealable interface therebetween. On the radially opposite end of the seal 10, the energizer 30 maintains a static seal between the seal body 12 and the circumferential rib 32 of the housing 16. The frictional contact between the energizer 30 and the rib 32 also prevents the seal body 12 from rotating relative to the housing. The energizer 30 may also facilitate maintaining the sealing lip 24 against the shaft 14 through the tensile forces transmitted about the base 22.

As previously discussed, the energizer 30 is seated between the opposing seal legs 28. The energizer 30 defines an overall outer diameter which is less than the diameter of the seal bore 20, but preferably slightly greater than the diameter defined by the circumferential rib 32. This allows the circumferential rib 32 to be securely maintained between the seal legs 28 while the energizer 30 maintains sealable contact with the housing 16. This configuration also allows each of the legs 28 to thermally expand without physical restriction. As illustrated, each of the legs 28 can diametrically expand into the space 37. This space 37 is sized to accommodate the maximum anticipated thermally induced diametrical expansion of the seal body 12. The configuration of the circumferential rib 32 within the seal bore which is received between the legs 28 of the seal, advantageously maintains the seal 10 in position along the shaft 14 without creating a physical barrier preventing the thermal and physical expansion of the seal 10.

The compressibility of the energizer 30 allows the base portion 22 of the seal body 12 to diametrically expand without substantial physical restriction. As the seal body 12 thermally expands diametrically, the base portion 22 pushes radially outward against the energizer 30. The compressibility of the energizer 30 advantageously allows this expansion without substantial restraint. The overall configuration advantageously allows the radial lip seal 10 of the present invention to float within the seal bore 20 of the housing 16.

Referring now to FIG. 11, in conjunction with FIG. 1, the radial lip split seal 10 of the present invention is illustrated in a thermally expanded state. This may be, for example, when operating with a high speed rotating shaft 14 or where operating conditions are relatively hot and with substantial thermal effects. In these operating conditions, the annular spacing 37 between the diameter of the seal bore 20 and the overall outer diameter defined by the legs 28 of the seal 10 is at a practical minimum. The seal 10 has thermally expanded to minimize this spacing 37.

As the housing 16 and the seal 10 thermally expand from the thermal state previously illustrated in FIG. 10, the legs 28 slide against the sides of the circumferential rib 32. Preferably, the legs 28 are sufficiently spaced apart that movement relative to the sides of the circumferential rib 32 is relatively unrestricted and frictionless. However, the legs 28 should support the seal 10 within the seal bore 20 without substantial free play or axial movement.

In addition, as the seal body 12 diametrically expands, the energizer 30 is compressed. As previously mentioned, the energizer 30 is preferably made from a compressible material, such as an elastomeric material, to allow for the expansion of the seal 10 and housing 16 without substantial physical restriction. The energizer 30 maintains sealable contact between the circumferential rib 32 and the base portion 22 of the seals body 12 and prevents the passage of fluids. In addition, the energizer 30, through its compressibility, allows the housing 16 and the seal 10 to thermally expand and contract without transmitting substantial physical force into the seal body 12. This prevents the stresses and resizing typically encountered when a seal expanded within a fixed seal bore.

FIG. 12 illustrates a second embodiment radial lip seal 40 that is general similar to the first embodiment seal described above and illustrated, except for the way in which the seal fits together with the seal housing 42. Specifically, the radial lip seal 40 includes a body 44 having a base 46 that has a radial thickness greater than the base of the first embodiment seal to facilitate radial placement of the seal body within the seal housing 42. The seal body 44 also includes a pair of legs 48 that project radially upwardly away from the base 46 along axial ends of the seal. The seal body legs 48 each have an axial thickness less than that of the legs of the first embodiment seal because they are not used to trap a seal housing extension therebetween. Rather, the seal legs 48 are configured in this manner to facilitate their placement within a groove 50 disposed within the seal housing.

The seal housing groove 50 is sized having a sufficient radial width to accommodate placement of the seal legs 48 and axial seal body surfaces therein, and permit radial movement of the seal therein. The groove 50 is sized having a sufficient depth to fix the axial placement of the seal therein so the seal does not move axially when placed into sealing operation around the shaft 52. An energizer 54 is disposed within the seal pocket 56, and is interposed between the seal and housing groove, to both provide a leak-tight seal between the seal and seal housing, and to permit the seal to move radially a controlled amount therein. The remaining elements of the second embodiment seal 40 are the same and perform the same functions as those elements described above for the first embodiment seal.

Figure 13:
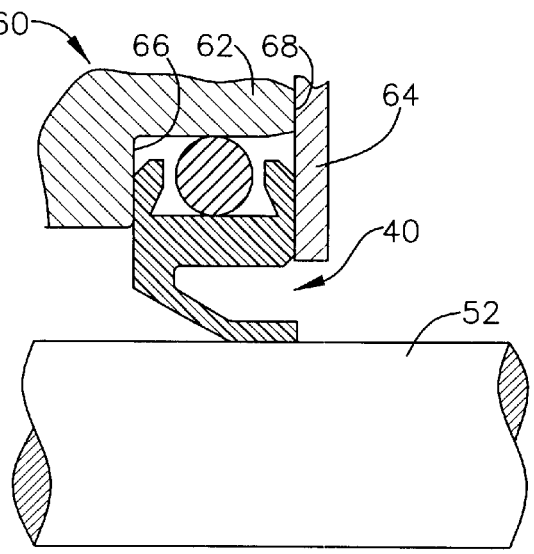
FIG. 13 is a schematic cross-sectional side view of the second embodiment radial lip seal as shown in FIG. 12, disposed within a two-piece seal housing.

FIG. 13 illustrates the second embodiment radial lip seal 60 as disposed within a multi-piece seal housing assembly 60. In an example embodiment, the multi-piece seal housing 60 comprises a two-piece assembly that includes a seal housing 62 and a cover plate 64. The seal housing is configured having a channel 66 disposed therein that is shaped to accommodate both an axial surface and an outside diameter of the seal therein. The cover plate 64 is designed to be attached to an end 68 of the seal housing to confine the opposite exposed seal axial surface, thereby forming a groove with the seal housing to contain a portion of the seal therein. The multi-piece seal housing assembly is designed to prevent the seal from moving axially therein, and to enable the seal to move radially therein while maintaining a leak-tight seal therewith when place in operation around a rotating shaft 52.

Figure 14:
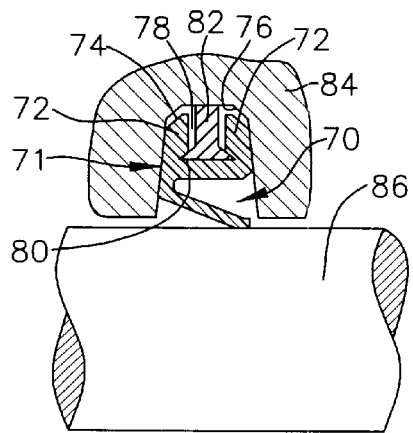
FIG. 14 is a schematic cross-sectional side view of a third embodiment radial lip seal and complementary seal housing, constructed according to the principles of the present invention, as shown surrounding a shaft.

FIG. 14 illustrates a third embodiment radial lip seal 70 that is configured generally similar to that of the second embodiment seal, i.e., for placement within a seal housing groove. A difference, however, is that the third embodiment seal body 71 includes radially projecting legs 72 that have tapered distal end surfaces 74, which end surfaces are configured for placement within a seal housing groove 76 that also has complementary tapered surfaces. Additionally, the third embodiment seal 71 includes a pocket 78 having an outwardly flared portion adjacent the seal body base. An energizer 80, in the form of an elastomeric ring is disposed within the pocket 78. The elastomeric ring, has a generally rectangular cross section extending axially away from the seal pocket and towards the seal housing. The elastomeric ring has a flared inside diameter end that is sized to fit within the flared end of the seal pocket 78 to thereby hold the different pieces of the seal together. The remaining seal elements and the energizer function in the same manner as described above for the first and second seal embodiments to permit the seal to move radially within the seal housing 84 when placed into operation around a rotating shaft 86.

It will be understood that various modifications may be made to the present invention herein disclosed without departing from the spirit and scope thereof. For example, various types and combinations of seal housings and seal bodies are contemplated which allow for the free floating and substantially unrestricted expansion of the seal body without substantial physical restriction. Also, various modifications may be made in the size, thickness, diameter, shape, materials and configuration of the parts and their interaction. Therefor, the above description should not be construed as limiting the invention but merely an exemplification of preferred embodiments thereof. Those of skill in the art will envision other modifications within the scope and spirit of the present invention as defined by the claims appended hereto.

What is claimed is:

1. A radial seal assembly comprising:
   an annular seal body having a channel disposed along an outside seal diameter and a channel base that defines the depth of the channel;
   a pair of legs that are spaced axially apart and that each extend radially away from the seal body, the legs defining axial surfaces of the seal body and axial sidewall surfaces of the channel;
   a sealing lip extending radially inwardly away from an inside seal body diameter, the sealing lip being integral with and made from the same material as the seal body and including an end portion that is adapted to form a seal against a rotary shaft surface; and an annular energizer disposed within the channel to provide a determined amount of radial seal movement within a seal housing disposed around the channel;

wherein the annular energizer is in contact with both the seal and the seal housing to provide sealing surfaces between the seal and the seal housing when the seal is placed into sealing operation around the rotary shaft surface and a circumferential rib located on the seal housing being disposed at least in part in between the pair of legs.

2. The seal as recited in claim 1 wherein the radial seal is disposed within the seal housing, the seal housing comprising:

a circular bore having a diameter sized to accommodate placement of the seal therein; and a groove disposed within the bore and having a sufficient depth to accommodate at least a portion of the seal body legs therein, the seal channel and energizer being sized to permit radial movement of the seal within the seal housing.

3. A radial split seal assembly for sealably surrounding a rotatable shaft, the assembly comprising:

a radial split seal comprising:

an annular seal body formed from at least two semi-annular seal body sections, each seal body section having distal ends that are connected with distal ends of an adjacent seal body section to provide sealable contact therewith;

a channel disposed within an outside diameter of the seal body, the channel having a base and being defined along sidewall surfaces by two legs that extend radially outwardly from the base;

a sealing lip extending radially inwardly from the seal body and forming the seal inside diameter, the sealing lip including an end portion adapted for sealable contact against the rotatable shaft; and an annular elastomeric member disposed within the channel; a seal housing comprising:

a bore disposed within the seal housing to accommodate placement of the seal therein; and means for fixing the axial position of the seal within the bore, wherein the means cooperates with the seal elastomeric member to enable radial movement of the seal when the seal is placed into sealing operation around the rotatable shaft; wherein the seal elastomeric member is in contact with the seal body and the seal housing to provide a leak-tight seal therebetween.

4. The seal assembly as recited in claim 3 wherein the means is a groove disposed within the bore and at least a portion of the seal legs are disposed within the groove.

5. The seal assembly as recited in claim 4 wherein the outside diameter of the seal body is less than a diameter of the groove within the seal housing bore so that the seal is movable radially within the bore by compression of the elastomeric member within the channel between the groove and the channel base.

6. The seal assembly as recited in claim 3 wherein the annular elastomeric member comprises an O-ring.

7. The seal assembly as recited in claim 3 wherein at least a portion of each of the semi-annular seal body sections is formed from a fluoropolymeric material.

8. The seal assembly as recited in claim 7 wherein at least a portion of each of the semi-annular seal body sections comprises polytetrafluoroethylene.

9. The seal assembly as recited in claim 7 wherein the fluoropolymeric material includes a low friction filler material.

10. The seal assembly as recited in claim 3 wherein the annular elastomeric member is compressible between the seal body and the seal housing to allow for radial thermal expansion and contraction displacement of the seal within the housing.

11. A radial lip seal assembly comprising:

a radial lip seal having an annular seal body that is at least partially formed from a fluoropolymeric material, the body having channel disposed radially inwardly a depth along a seal body outside diameter, and having an energizing member disposed within the channel, the channel having a depth that is less than a radial dimension of the energizing member, the seal body comprising a sealing lip that is integral with and made from the same material as the seal body and that extends radially inwardly from the seal body, wherein the sealing lip is adapted to provide a leak-tight seal against a rotary shaft surface; and a seal housing having a bore for accommodating the seal therein, the bore including a groove disposed radially therein, at least a portion of the seal body being disposed within the groove to prevent axial movement of the seal within the seal housing, wherein the energizing member is interposed between the seal channel and seal housing groove to compress and permit a determined amount of radial seal movement within the seal housing.

12. The seal as recited in claim 1 wherein the radial seal is disposed within the seal housing, the seal housing comprising:

a circular bore disposed within the seal housing having diameters sized to accommodate placement of the seal therein; and wherein the circumferential rib extends radially inwardly from the bore, the circumferential rib being disposed within the seal body channel.

* * * * *